United States Patent
Jones et al.

(10) Patent No.: US 6,421,055 B1
(45) Date of Patent: Jul. 16, 2002

(54) METHOD AND APPARATUS FOR SYSTEM ENHANCEMENT TO DEVICE BACKUP FONT SUPPORT

(75) Inventors: Scott Thomas Jones; Marc Leslie Cohen; Mark Joseph Hamzy; Lee Martin Tartak, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/276,385

(22) Filed: Mar. 25, 1999

(51) Int. Cl.[7] .............................................. G06T 11/60
(52) U.S. Cl. ...................... 345/471; 707/542
(58) Field of Search ................. 345/471, 467, 345/418, 468, 469, 469.1, 470, 636; 707/501, 502, 542, 500, 529, 530; 355/18, 19; 380/51, 55

(56) References Cited

U.S. PATENT DOCUMENTS 5,533,174 A * 7/1996 Flowers, Jr. et al. ....... 358/1.15
6,073,147 A * 6/2000 Chan et al. .................. 707/542
6,081,623 A * 6/2000 Bllomfield et al. ......... 382/239

* cited by examiner

*Primary Examiner*—Michael Razavi
*Assistant Examiner*—Thu-Thao Havan
(74) *Attorney, Agent, or Firm*—Duke W. Yee; Jeffrey S. LaBaw; Christopher P. O'Hagan

(57) ABSTRACT

The present invention provides a method and apparatus in a data processing system for printing characters. Data received include glyphs for output on an output device, wherein the glyphs are to be output using a selected device font. A list containing all device font supported glyphs is passed to the operating system. Monitoring for unsupported glyphs in the selected device font is performed by the operating system. In response to detecting a glyph unsupported by the selected device font, a backup system font is used to output the glyph to the output device.

20 Claims, 4 Drawing Sheets

METHOD AND APPARATUS FOR SYSTEM ENHANCEMENT TO DEVICE BACKUP FONT SUPPORT

BACKGROUND OF THE INVENTION

1. Technical Field

The present invention relates to the field of information handling systems and in particular to an improved data processing system for presenting information to a user. Still more particularly, the present invention relates to a method and apparatus for providing backup font support for missing device font glyphs.

2. Description of Related Art

During the creation of a print job, an application may use a variety of fonts and glyphs within the fonts to produce the desired text output on an output device, such as a printer or display device. A glyph is described as an image, usually an individual character within a font, or a graphic symbol whose appearance conveys information, such as, for example, the vertical and horizontal arrows on cursor keys that indicate the directions in which they control cursor movement. Typically, the application selects a code page which defines the character encoding and the set of glyphs being used within the font. A code page is a standard character encoding that identifies a set of glyphs. A problem occurs when a font does not support all of the glyphs within a code page. In this instance, glyphs not present in the font are not printed.

More specifically, when new glyphs are created, such as the recent introduction of the Euro Currency character, many hardware devices that contain device fonts cannot be readily updated to add the new glyph support. In the case of printing devices, this creates a situation where the new glyphs are simply missing or incorrectly printed. One presently available method for printing missing glyphs involves turning off device fonts and using system fonts. A disadvantage with this method is that the amount of data downloaded to the printer increases by orders of magnitude, reducing efficiency in printing documents. Another currently available technique for providing missing glyphs is to have the device driver call the graphics system each time the device driver detects that a glyph is not supported by its device font. Thus, each device driver is constantly calling the graphics system to simulate unsupported glyphs in a backup system font. A disadvantage with this method is that the number of calls to the graphic system can be excessive, causing the printing process to stand by while the unsupported glyph is being simulated by the graphics system. Therefore, it would be advantageous to have an improved method and apparatus for outputting glyphs.

SUMMARY OF THE INVENTION

The present invention provides a method and apparatus in a data processing system for printing characters. Data received includes glyphs for output on an output device, wherein the glyphs are to be output using a selected device font. A list containing all device font supported glyphs is passed to the operating system. Monitoring for unsupported glyphs in the selected device font is performed by the operating system. In response to detecting a glyph unsupported by the selected device font, a backup system font is used to output the glyph to the output device.

BRIEF DESCRIPTION OF THE DRAWINGS

The novel features believed characteristic of the present invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
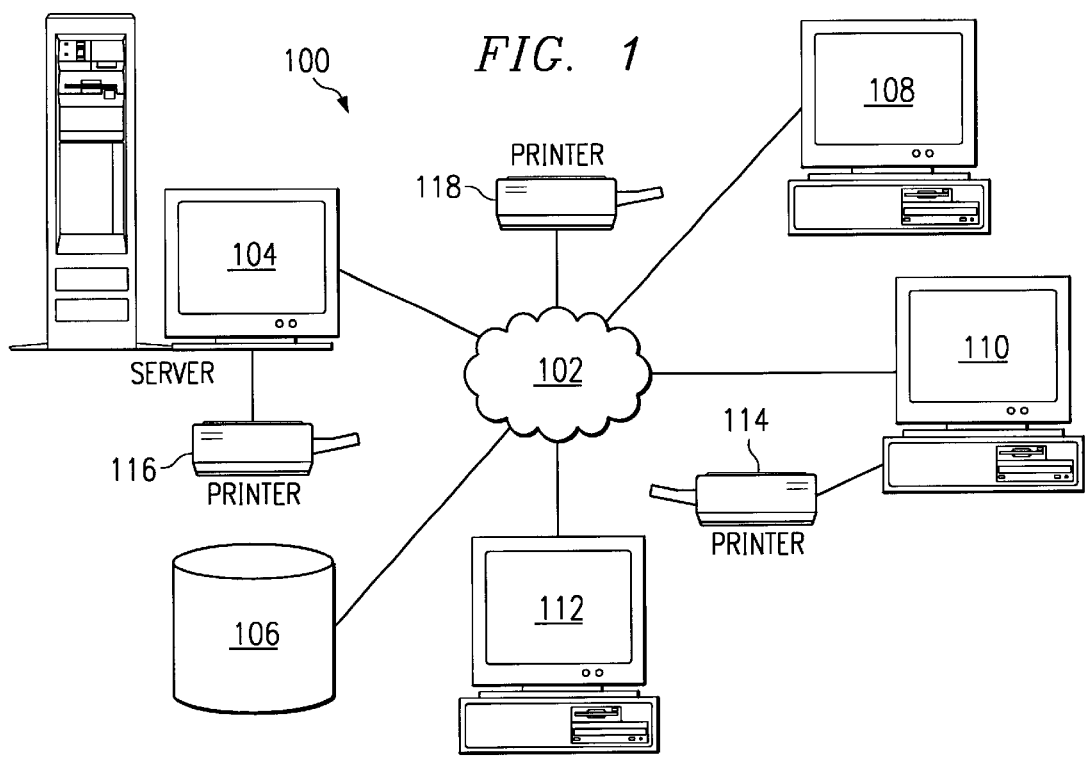
FIG. 1 is a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected together within distributed data processing system 100. Network 102 may include permanent connections, such as wire or fiber optic cables, or temporary connections made through telephone connections.

In the depicted example, server 104 is connected to network 102 along with storage unit 106. In addition, clients 108, 110, and 112 are also connected to network 102. These clients 108, 110, and 112 may be, for example, personal computers or network computers. For purposes of this application, a network computer is any computer coupled to a network which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. Distributed data processing system 100 also includes printers 114, 116, and 118. A client, such as client 110, may print directly to printer 114. Clients such as client 108 and client 112 do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems that route data and messages. Of course, distributed data processing system 100 also may be implemented as a number of different types of networks, such as, for example, an intranet or a local area network.

FIG. 1 is intended as an example and not as an architectural limitation for the processes of the present invention.

Figure 2:
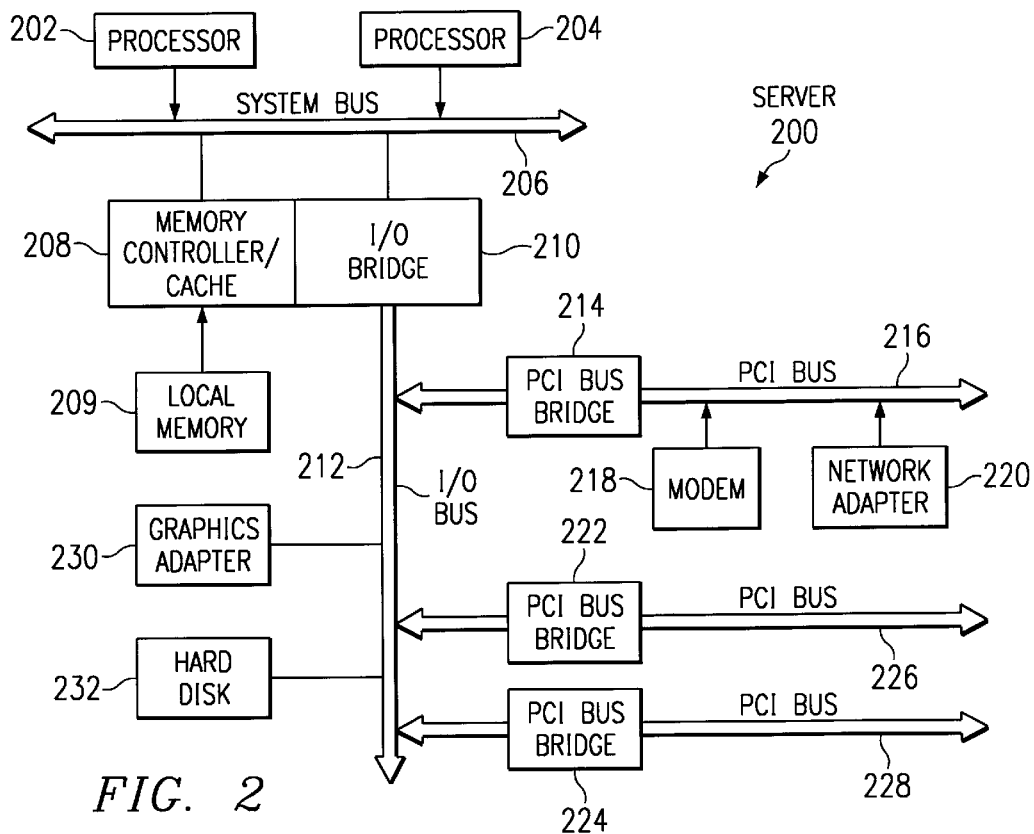
FIG. 2 is a block diagram of a data processing system which may be implemented as a server in accordance with the present invention.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
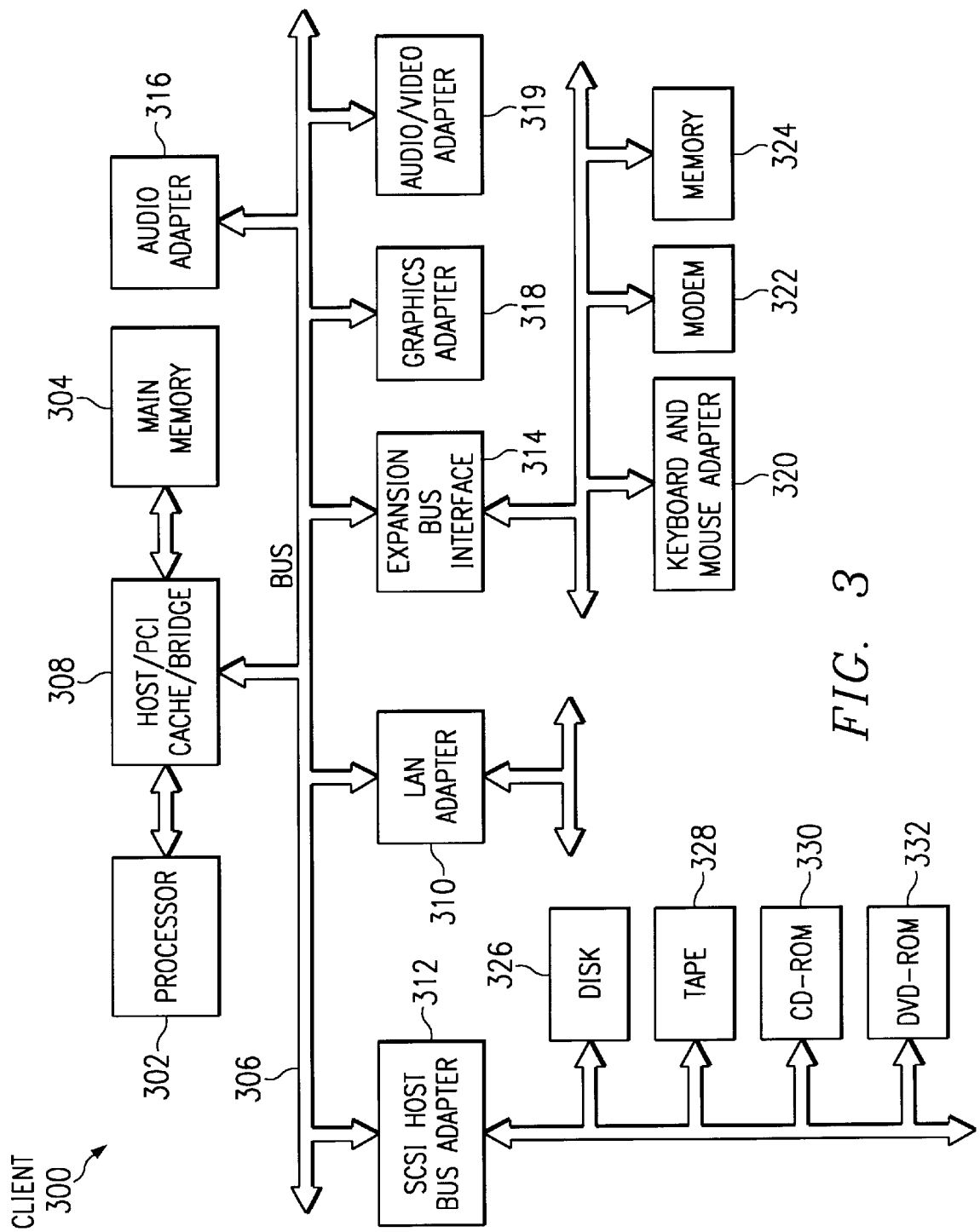
FIG. 3 is a block diagram of a data processing system in which the present invention may be implemented.

With reference now to FIG. 3, a block diagram of a data processing system in which the present invention may be implemented, is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, CD-ROM drive 330, and digital video disc read only memory drive (DVD-ROM) 332 in the depicted example. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

The present invention provides a method, apparatus, and instructions for providing backup font support for missing glyphs. A mechanism is provided in which a device driver, such as, for example, a printer driver or video driver, informs a graphic subsystem which characters or glyphs it supports. Once the application has chosen a font, the device driver sends a list of characters or glyphs supported by its device fonts. The graphics drawing subsystem can then provide a backup font when it determines that a character or glyph to be sent to the device driver is not on the list. In such an instance, the graphics drawing subsystem draws the character or glyph. Furthermore, high performance characteristics of various fonts, such as printer fonts, are available for the majority of the output while also providing support for characters that the device driver does not have the character definitions to draw. In this manner, device fonts are only turned off or not used when certain or selected glyphs unsupported by the device driver are encountered rather than drawing them completely using the graphic subsystem as presently performed.

Figure 4:
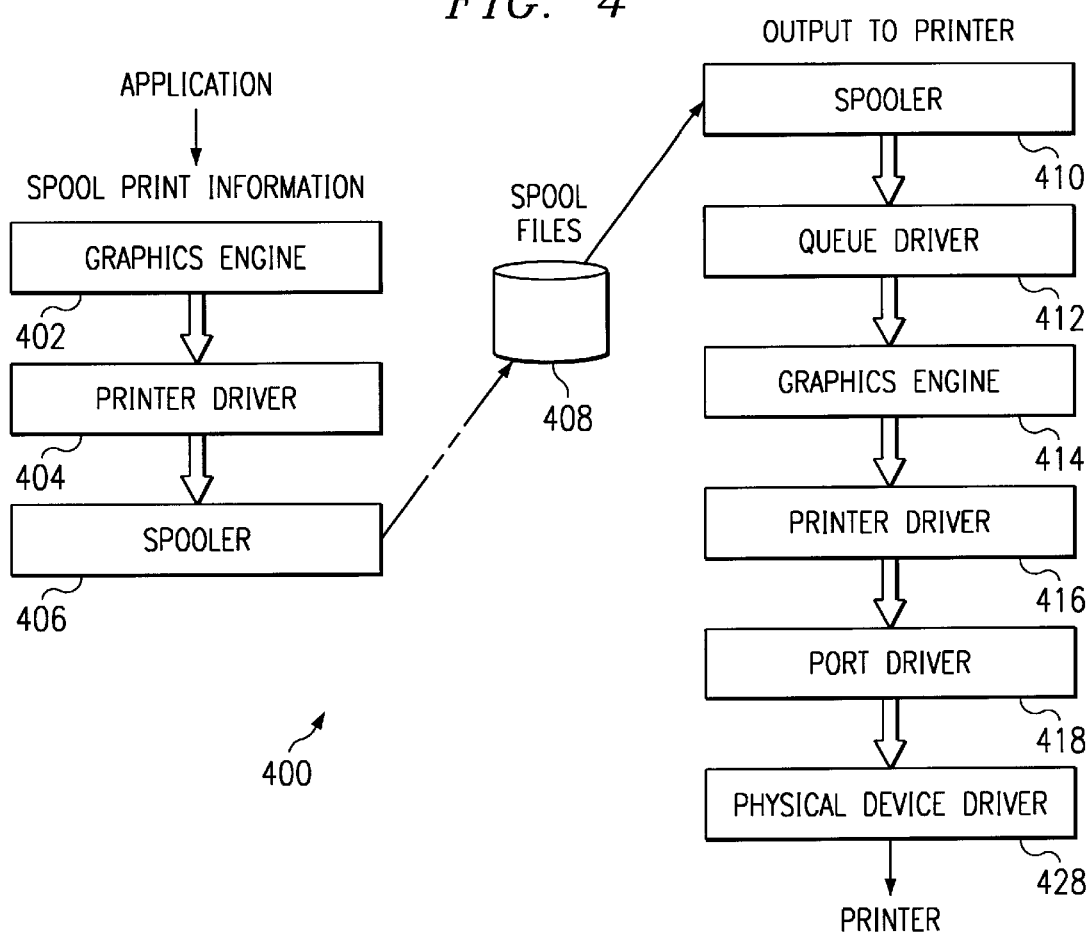
FIG. 4 is a block diagram illustrating a typical print system in accordance with a preferred embodiment of the present invention.

Turning now to FIG. 4, a block diagram illustrating a print system is depicted in accordance with a preferred embodiment of the present invention. Print system 400 performs the spooling and creation of a printer specific data stream on behalf of the application submitting the print request. In the depicted example, the printing process in print system 400 is divided into two phases, spooling or queuing of the print data, and de-spooling or sending the data to the output device. The creation of the printer specific data stream may be performed during the spooling phase. Alternatively, in some configurations where a metafile is used as a spool file, the printer specific data stream connectivity and server functionality, both phases of the print process, may be done on a single system, or the first phase may be done on a client such as client 110 in FIG. 1, and the second phase may be done on a server such as server 104 in FIG. 1.

Graphics engine 402 is a component of or is employed with a combination of components to produce similar functionality for print system 400. Not shown in FIG. 4 is the initialization phase which occurs prior to spooling, wherein the application chooses a font and passes the font style or facename to graphics engine 402. Graphics engine 402 stores the facename and sends the application's facename selection to printer driver 404. In response to printer driver 404 being apprised of the application's facename, printer driver 404 determines the extent of the glyphs supported by the printer driver and passes a list of all glyphs supported by the device driver to graphics engine 402. Along with the list of supported glyphs, printer driver 404 also sends information about the preferred backup font, such as the preferred backup facename and font metrics describing the device font which will enable graphics engine 402 to select a backup font having similar characteristics as the device font.

Initially, printer driver 404 downloads a list containing every glyph in the device font supported by the device driver to graphics engine 402. This list is supplemented by the preferred backup facename and device font metrics. Graphics engine 402 can then use this information to select a backup font which is most similar to the device font. In this example, the device driver is a printer driver. Selecting the backup font might be as simple as using the facename font received from printer driver 404 or as complicated as comparing all systems fonts to the font metrics passed from printer driver 404. Once the backup font is selected, graphics engine 402 can then use the list of device supported glyphs to determine which glyphs are supported by the device driver and which must be simulated by the graphics subsystem.

In the rendering and de-spooling phase, graphics engine 402 is responsible for determining which glyphs are or are not supported by printer driver 404. After printer driver 404 sends graphics engine 402 a list of device supported glyphs, graphics engine 402 makes all the decisions about which glyphs should be taken from the backup fonts. In this way, graphics engine 402 only sends glyphs supported by printer driver 404 to printer driver 404. Graphics engine 402 identifies unsupported characters or glyphs and simulates those glyphs from the backup font before sending them to printer driver 404. For example, if a string of several characters is sent to graphics engine 402 and the sub-string of several different characters is unsupported, graphics engine 402 simulates those unsupported characters and passes the simulated characters on to printer driver 404. Printer driver 404 creates the printer specific data from the device fonts sent to printer driver 404. Printer driver 404 then sends the printer specific data to the printer to produce the desired output. In many instances, graphics engine 402 provides configurable settings and returns information about the device. In some systems, printer driver 404 is called a formatter since it formats the data appropriately for the printer. In other systems, this component is called a transformer since it transforms operating systems calls for input stream to the data stream appropriate for the printer.

Spooler 406 is a component of print system 400 that stores and retrieves the print jobs as spool files 408 using a queue algorithm to coordinate access to the printer: In the de-spooling phase, spooler 410 retrieves print jobs from spool files 408. The data is later printed when queue driver 412 is available. Queue driver 412 is used to pre-format the spool data from spool files 408 before sending the data to the printer driver installed for the device. Usually, queue driver 412 is handling a case where a metafile has been spooled to spool files 408 and the metafile must be played back to the underlying print components by calling operating system components that parse the metafile and convert the metafile back to graphics calls that can be passed to the graphics engine. In other instances, when printer specific data has been spooled, queue driver 412 simply passes the raw data to the underlying components of the print system.

Graphics engine 414 is then employed from queue driver 412 to convert the spooled data to printer driver calls. Printer driver 416 is then responsible for creating the printer specific data necessary to produce the desired output. Some printing systems separate the logic of how to communicate or send data to the printer device into a port driver 418, which is responsible for handling the device driver interface to the printer. Physical device driver 420 is a component responsible for the hardware protocols, such as, for example, hardware interrupts. It also supports a set of input and output functions used to communicate with or transmit data to the printer.

When the spooling and de-spooling phases are performed on the same computer, graphics engine 402 is the same graphics engine as graphics engine 414. Also, printer driver 404 and spooler 406 correspond to printer driver 416 and spooler 410. These components are different when the de-spooling or the actual printing of a print job from spool files 408 is performed at a computer other than the one in which the print job is generated by an application.

Printer driver 416 includes device fonts, which are fonts owned and handled by the device. System fonts are fonts that are owned and handled by the operating system. When graphics engines 402 or 414 receive a list of glyphs supported by the printer driver, the operating system determines which backup font should be used from information about backup fonts sent from the device driver with the list of glyphs. In the depicted example, the backup font is a system font provided by the operating system. The processes for selecting and automatically using a backup font to provide missing glyphs is described in more detail below.

Figure 5:
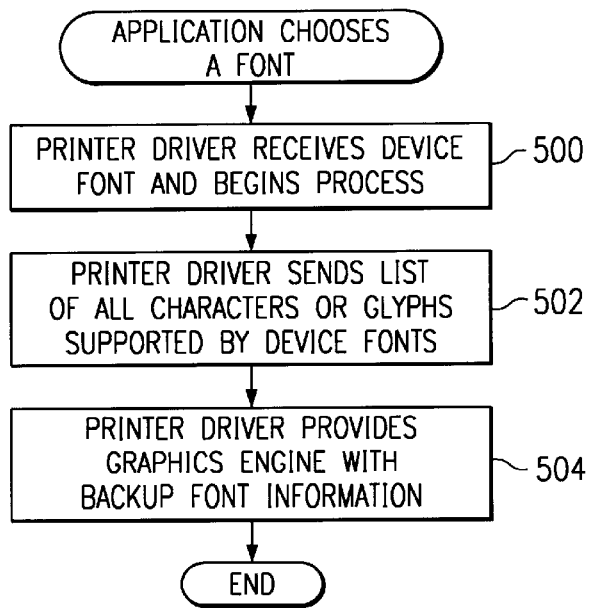
FIG. 5 is a flowchart of a process of an application selecting a backup font in accordance with a preferred embodiment of the present invention.

Referring next to FIG. 5, a flowchart of a process for selecting a backup font is depicted in accordance with a preferred embodiment of the present invention. In the depicted example, the backup font is a system font that is employed to supply missing glyphs encountered in a device font during the printing process.

This process begins when an application chooses a font. The process proceeds with the printer driver receiving the font chosen by the application. With the application font information, the printer driver begins the printer driver initialization (step 500). In the depicted example, this font is a device font. The printer driver then compiles a list of the entire range of glyphs supported by this font. Next, the printer driver sends the list of all characters or glyphs which are supported by the device fonts (step 502). In passing the list of supported glyphs to the graphics subsystem, the printer driver is essentially giving control to the graphics subsystem for any decision as to which glyph should be taken from the backup fonts. The list provided to the operating system includes the ranges of glyphs that the printer driver supports. The backup font will be required for all other glyphs.

In order for the graphics subsystem to select the most appropriate system font as a backup font in appearance, the printer driver also provides the operating system with information about the backup font so that the operating system can select the appropriate backup font (step 504). Information provided to the graphics subsystem in the operating system may include, for example, font name and font metrics, which are more precise characteristics of the font used for font selection.

Figure 6:
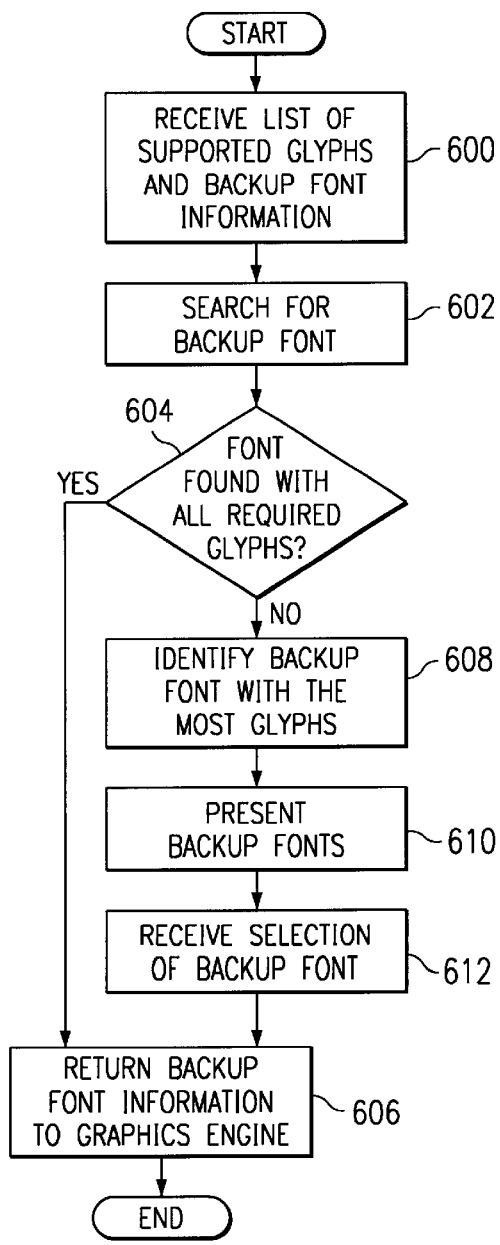
FIG. 6 is a flowchart of a process for selecting a backup font in accordance with a preferred embodiment of the present invention.

Turning next to FIG. 6, a flowchart of a process used by the operating system for selecting a backup font is depicted in accordance with a preferred embodiment of the present invention. In the depicted example, the process in FIG. 6 is implemented by the operating system to select an appropriate system font. The process begins when the graphics subsystem receives a list of glyphs supported by the printer driver (step 600). This list includes backup font information used by the operating system to select a font which is similar in appearance to the device font. This information describes the font or characteristics of the font required to print glyphs not supported by the device font. The operating system then performs a search for the appropriate backup font (step 602). An appropriate backup font may be one that has more characters available than the device font. It is then determined whether or not a backup font has been found that is able to support all of the glyphs unsupported by the device font (step 604). If such a font has been found, backup font information is returned to the graphics engine (step 606), and the process terminates thereafter.

If a font containing all of the glyphs missing from the device font is not present, the backup font with. the most glyphs is identified as the backup font for use by the printer driver (step 608). Optionally, the path through 610 and 612 may be taken, in which case backup fonts are presented for selection (step 610). In this manner, a user may select the backup font that contains glyphs most important for printing. Thereafter, a selection of the backup font is received (step 612), and the process proceeds to step 606, as described above. Alternatively, in step 608, more than one backup font may be identified, thereby using backup fonts to support the entire range of glyphs missing from the device font.

The process described above and illustrated in FIG. 6 is performed by the graphics engine within the graphics subsystem of the operating system.

Figure 7:
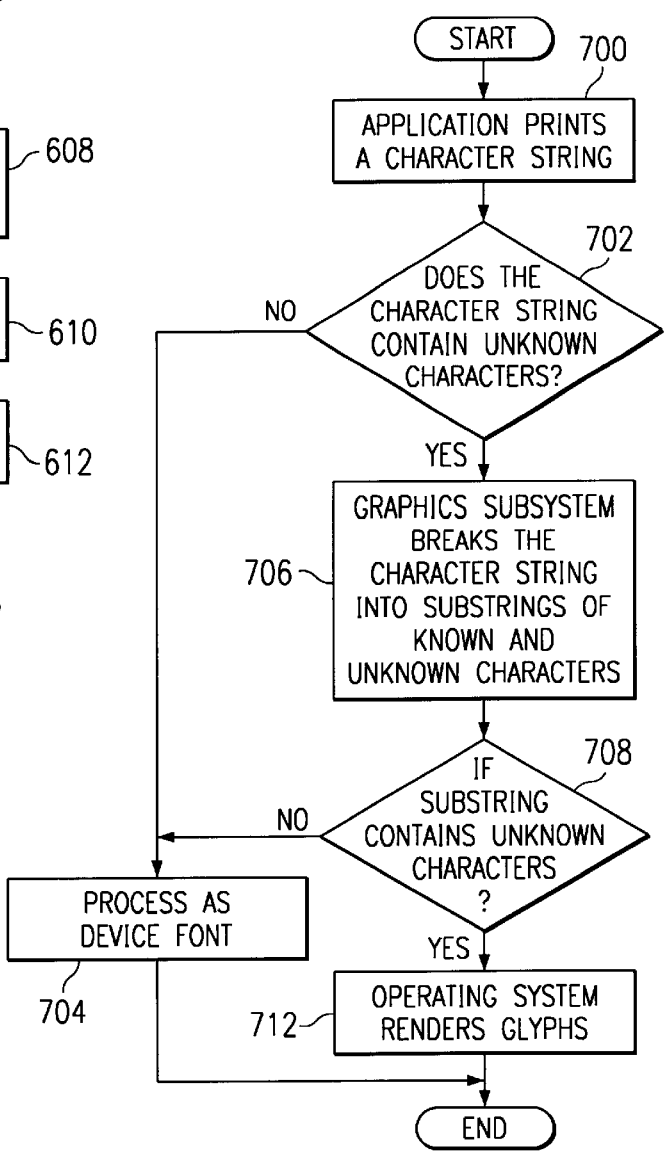
FIG. 7 is a flowchart of a process for the application printing a character string in accordance with a preferred embodiment of the present invention.

Turning now to FIG. 7, a flowchart of a process for the application printing a character string is depicted in accordance with a preferred embodiment of the present invention. The process begins by the application printing a character string to the graphics subsystem (step 700). A determination is made by the graphics subsystem as to whether or not the character string contains glyphs that are unavailable in the device font (step 702). This is accomplished by comparing the characters in the character string to the device font supported characters on the list passed from the device driver. If the character string does not contain any glyphs that cannot be created by the device font, the character string is processed as a normal device font (step 704), and the process terminates thereafter.

If the character string does contain glyphs that are unavailable in the device font, the graphics subsystem breaks the character string into substrings consisting of known and unknown characters or glyphs (step 706). Each substring is processed according to the contents of the substring. The boundaries of the substring are defined by the glyphs known and unknown to the device font. In other words, a substring contains either all known glyphs or all unknown glyphs. To reach this level, several iterations of parsing may be required by the graphics engine.

A determination is made as to whether or not the substring contains unknown characters or glyphs (step 708). If the substring does consist of known characters or glyphs, the substring is processed as a normal device font string, as described above in step 704. If, however, the substring contains unknown characters or glyphs, the unknown characters or glyphs are processed using a backup font. The operating system utilizes the backup font and backup font information to render the glyphs, employing a process of converting graphic drawings or font size and positioning calls to device specific data (step 712). The process terminates thereafter.

In a preferred embodiment, the present invention can be implemented by using a generic printer driver. The generic printer driver is a device driver that supports a variety of different output devices from various manufacturers rather than only a single device. The generic printer driver is intended to support all printer configurations and models that are supported by the device manufacturers. The generic printer driver is responsible for identifying the system font to be used for backup and for notifying the graphics engine when this backup font is to be used instead of the device font for every device it supports. This is accomplished in the initialization phase. When the generic printer driver is opened, it passes a list of all device fonts and all glyphs supported for each device font. It also passes information about the preferred backup font for each device font. In a preferred embodiment of the present invention, the information consists of the preferred backup facename but may include font metrics describing the device font that would enable the graphics engine to select a backup font having similar characteristics as the device font.

The generic printer driver differs from a conventional device driver in that it provides only a thin level of support for a number of different devices; whereas, conventional device drivers include much broader support, but usually for only a single device. The generic printer driver relies on the graphics engine to provide its functionality. When the graphics engine has broken down to the simplest possible format, it calls the generic printer driver. This call only contains characters in the device font; it does not contain backup font characters. Therefore, the generic printer driver may be slightly slower due to its reliance on the graphics engine for unsupported glyphs. However, when changing times necessitate updating fonts or adding new glyphs, the generic printer driver is much easier to update because only a single driver needs to be modified, unlike conventional device drivers which require modification of each driver associated with every device for the new glyphs or font updates.

It is important to note that, while the present invention has been described in the context of a fully functioning data processing system, those of ordinary skill in the art will appreciate that the processes of the present invention are capable of being distributed in a form of a computer readable medium of instructions and a variety of forms, and that the present invention applies equally regardless of the particular type of signal bearing media actually used to carry out the distribution. Examples of computer readable media include recordable-type media such as floppy discs, hard disk drives, RAM, and CD-ROMs and transmission-type media such as digital and analog communications links.

The description of the present invention has been presented for purposes of illustration and description but is not limited to be exhaustive or limited to the invention in the form disclosed. Many modifications and variations will be apparent to those of ordinary skill in the art. For example, although the depicted embodiment is directed towards a device driver that is in the form of a printer driver for printing various characters and glyphs to a printer, the present invention may be employed to provide support for missing glyphs for other types of output devices, such as a display device. In addition, although the depicted example illustrates processes of the present invention implemented in a device driver, the processes of the present invention may be implemented in other components called by the device driver. This embodiment was chosen and described in order to best explain the principles and practical application of the invention, and to enable others of ordinary skill in the art to understand the various embodiments of the invention, as well as various modifications suited to the particular use contemplated.

What is claimed is:

1. A method in a computer system for printing, the computer system including an operating system, the method comprising:

receiving a plurality of characters for printing at the operating system in a computer system, wherein the plurality of characters are to be printed using a selected font; and responsive to a determination by the operating system that a specific character within the plurality of characters is absent from the selected font, printing the specific character using a backup font containing the specific character, while printing other characters within the plurality using the selected font.

2. The method of claim 1, wherein the printing step comprises:

passing a list of supported characters from a printer driver to the operating system;

determining from the list if a specific character is supported by the printer driver;

downloading the specific character contained in the backup font to the printer driver; and printing the specific character in the backup font, while printing other characters using the selected font.

3. The method of claim 1, wherein the specific character is accessed by the operating system.

4. A method in a computer system for displaying characters using a font on a display device, the method comprising:

receiving a data stream including characters for display on the display device; and responsive to a determination that a specific character in the data stream is absent from the font, displaying the specific character using a backup font containing the specific character, while other characters are displayed using the font.

5. A method in a data processing system for printing characters, the method comprising the data processing system implemented steps of:

receiving data including glyphs for output on an output device, wherein the glyphs are to be output using a selected font;

receiving list data of glyphs supported by the output device;

monitoring for glyphs unsupported by the selected font; and responsive to detecting a glyph unsupported by the selected font, using a backup font to output the glyph to the output device, while remaining glyphs are output using the selected font.

6. The method of claim 5, wherein the output device is a printer.

7. The method of claim 5, wherein the output device is a display device.

8. The method of claim 5, wherein the receiving, monitoring, and using steps are implemented in an operating system.

9. The method of claim 5, wherein the receiving, monitoring, and using steps are implemented in a graphics system.

10. The method of claim 5, wherein a set of information about the selected font and the backup font is created for use in monitoring for glyphs unsupported by the selected font and for using a backup font to output the glyph to the output device.

11. A method in a computer system for presenting glyphs using an output device, the method comprising:

responsive to detecting a selection of font by an operating system, determining whether the font is able to output all glyphs in a range of glyphs that may be used;

selecting a backup font based on the range of glyphs;

responsive to receiving a data stream for output on the output device, determining whether particular glyphs are present that are outside of the range of glyphs; and responsive to a determination that the glyph is present, using the backup font to send the particular glyphs to the output device.

12. The method of claim 11, wherein the using step includes:

breaking up the data stream into a first set of glyphs containing glyphs within the range of glyphs and into a second set of glyphs containing glyphs outside of the range of glyphs;

sending the first set of glyphs using the selected font; and sending the second set of glyphs using the backup font.

13. The method of claim 11, wherein the output device is a printer.

14. The method of claim 11, wherein the output device is a video display device.

15. A printer system comprising:

a printer; and a device driver, wherein the device driver includes:

receiving means for receiving data including glyphs for output to the printer, wherein the glyphs are to be output using a selected font;

monitoring means for monitoring for glyphs unsupported by the selected font; and printing means, responsive to detecting a glyph unsupported by the selected font, printing glyph using a backup font to print the character at the printer.

16. The printer system of claim 15, wherein the printing means comprises:

requesting means for requesting the glyph in the backup font; and printing means for printing the glyph in the backup font.

17. A method in an operating system of a computer system for presenting glyphs using an output device, the method comprising:

receiving a list of supported glyphs in a first font;

determining if a selected glyph is on the list;

responsive to a determination that a selected glyph is not on the list, drawing the glyph as a second font; and sending the drawn glyph to the output device.

18. The method of claim 17, further comprises:

receiving descriptive information for describing the appearance of a preferred second font;

on the basis of the descriptive information, evaluating at least one font from a group of available fonts for appearance; and selecting the second font on a basis of the descriptive information.

19. The method of claim 18, wherein the descriptive information is a first basis, the step of evaluating further comprises:

determining if the at least one font of the group of available fonts contains at least one glyph not on the list of supported glyphs; and selecting the second font on a second basis of the at least one font of the group of available fonts containing at least one glyph not on the list of supported glyphs.

20. The method of claim 19, the step of evaluating further comprises:

determining if another font of the group of available fonts contains more glyphs not on the list of supported glyphs than the at least one font; and selecting the second font on the third basis of the another font having more glyphs not on the list of supported glyphs than the at least one font.

* * * * *

UNITED STATES PATENT AND TRADEMARK OFFICE
CERTIFICATE OF CORRECTION

PATENT NO.      : 6,421,055 B1
DATED           : July 16, 2002
INVENTOR(S)     : Jones et al.

It is certified that error appears in the above-identified patent and that said Letters Patent is hereby corrected as shown below:

<u>Title page, Item [54] and Column 1, line 2,</u>
Title, after "SYSTEM", please delete "ENHANCEMENT" and insert
-- ENHANCEMENTS --.

Signed and Sealed this

Sixth Day of May, 2003

JAMES E. ROGAN
*Director of the United States Patent and Trademark Office*